United States Patent
Bartolucci

(10) Patent No.: US 11,023,974 B2
(45) Date of Patent: *Jun. 1, 2021

(54) SYSTEMS AND METHODS FOR PROVIDING A CUSTOMIZABLE SPREADSHEET APPLICATION INTERFACE FOR AN ELECTRONIC TRADING SYSTEM

(71) Applicant: CFPH, L.L.C., New York, NY (US)

(72) Inventor: John P. Bartolucci, London (GB)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/689,051

(22) Filed: Nov. 19, 2019

(65) Prior Publication Data

US 2020/0090274 A1 Mar. 19, 2020

Related U.S. Application Data

(63) Continuation of application No. 16/029,231, filed on Jul. 6, 2018, now Pat. No. 10,504,181, which is a continuation of application No. 14/338,968, filed on Jul. 23, 2014, now Pat. No. 10,019,758, which is a continuation of application No. 10/223,307, filed on Aug. 15, 2002, now Pat. No. 8,793,176, which is a continuation-in-part of application No. 10/173,235, filed on Jun. 13, 2002, now abandoned.

(51) Int. Cl.
*G06Q 40/00* (2012.01)
*G06Q 40/04* (2012.01)
*G06F 40/18* (2020.01)

(52) U.S. Cl.
CPC ............. *G06Q 40/04* (2013.01); *G06F 40/18* (2020.01)

(58) Field of Classification Search
CPC .................................................. G06Q 40/00
USPC ............................................................ 705/37
See application file for complete search history.

(56) References Cited

U.S. PATENT DOCUMENTS

| | | |
|---|---|---|
| 5,663,951 A | 9/1997 | Danneels et al. |
| 5,864,827 A | 1/1999 | Wilson |
| 5,883,623 A | 3/1999 | Cseri |
| 6,009,455 A | 12/1999 | Doyle |
| 6,091,710 A | 7/2000 | Mawhinney |

(Continued)

FOREIGN PATENT DOCUMENTS

| | | |
|---|---|---|
| JP | 4279950 | 10/1992 |
| WO | WO 1999/057620 | 11/1999 |
| WO | WO 2001/069470 | 9/2001 |

OTHER PUBLICATIONS

USPTO Office Action for U.S. Appl. No. 10/223,307, dated Sep. 28, 2007 (8 pages).

(Continued)

*Primary Examiner* — Ojo O Oyebisi

(57) ABSTRACT

Systems and methods for providing a customizable spreadsheet application interface for an electronic trading system or market data source. A customizable spreadsheet application using the application interface according to the invention may be executed or stored either at the client or at a server. In either case, a user is preferably provided with an spreadsheet interface that allows the user to implement a real time electronic trading model. The trading model may preferably be used to trade in the electronic trading system without additional user intervention.

20 Claims, 5 Drawing Sheets

(56) References Cited

U.S. PATENT DOCUMENTS

| | | | |
|---|---|---|---|
| 6,134,535 A * | 10/2000 | Belzberg | G06Q 40/06 705/36 R |
| 6,330,719 B1 | 12/2001 | Zigmond et al. | |
| 6,349,295 B1 | 2/2002 | Tedesco et al. | |
| 8,793,176 B2 | 7/2014 | Bartolucci et al. | |
| 10,019,758 B2 | 7/2018 | Bartolucci et al. | |
| 10,173,235 B2 | 1/2019 | Lin et al. | |
| 2003/0043161 A1 * | 3/2003 | Tseng | G09G 5/001 345/581 |
| 2015/0052038 A1 | 2/2015 | Bartolucci et al. | |
| 2018/0315122 A1 | 11/2018 | Bartolucci | |

OTHER PUBLICATIONS

USPTO Office Action for U.S. Appl. No. 10/223,307, dated May 28, 2008 (12 pages).

USPTO Office Action for U.S. Appl. No. 10/223,307, dated Oct. 27, 2009 (7 pages).

Multi-C, "Give your Applications that 'Do Anything Anytime' Control!" at http://www.mixsoftware.com/product!multic.htm (printed Sep. 20, 2005).

UK Search Report for Application No. GB 0313122.4, dated Oct. 8, 2003 (3 pages).

USPTO Office Action for U.S. Appl. No. 10/223,307, dated Jul. 20, 2010 (8 pages).

USPTO Final Office Action for U.S. Appl. No. 10/223,307, dated Apr. 1, 2011 (7 pages).

USPTO Office Action for U.S. Appl. No. 10/223,307, dated Feb. 27, 2013 (5 pages).

USPTO Office Action for U.S. Appl. No. 10/223,307, dated Oct. 7, 2013 (4 pages).

USPTO Notice of Allowance for U.S. Appl. No. 10/223,307, dated Apr. 25, 2014 (10 pages).

* cited by examiner

SYSTEMS AND METHODS FOR PROVIDING A CUSTOMIZABLE SPREADSHEET APPLICATION INTERFACE FOR AN ELECTRONIC TRADING SYSTEM

CROSS-REFERENCE TO RELATED APPLICATION

This application is a continuation of U.S. patent application Ser. No. 16/029,231 filed on Jul. 6, 2018 which is a continuation of U.S. patent application Ser. No. 14/338,968 fled on Jul. 23, 2014 (now U.S. Pat. No. 10,019,758), which is a continuation of U.S. patent application Ser. No. 10/223,307 filed on Aug. 15, 2002 (now U.S. Pat. No. 8,793,176), which is a continuation-in-part of U.S. patent application Ser. No. 10/173,235, filed Jun. 13, 2002.

BACKGROUND OF THE INVENTION

This invention relates to an electronic trading system (hereinafter, "ETS") and methods for the electronic trading of fixed income related instruments—e.g., such as the United States Treasuries, United Kingdom Gilts, European Government Bonds, and Emerging Market debts, swaps, repos, etc. The invention may also be used for the electronic trading of securities or other financial instruments, such as stocks or currencies, and is not limited only to the trading of fixed income related instruments. More specifically, this invention relates to implementing a customizable spreadsheet application as the user interface for an electronic trading system.

For many issues of fixed income related instruments, the function of the human broker—i.e., the entity that matches a buyer and a seller of the fixed income related instrument—has been replaced by the ETS. More particularly, the ETS provides a trading system that is accessible by traders of the fixed income related instrument. This trading interface function of the ETS has substantially reduced the cost of trading because it has reduced the manpower required to execute a trade of the fixed income related instrument.

Nevertheless, the automation of the system as available to the trader is limited. For example, in an ETS, the trader must typically manually formulate his own bid to buy or offer to sell the fixed income related instrument and then key the bid or offer into an input device of a computer. This is patterned after the legacy requirement of verbally instructing the human broker to provide bids or offers. The trader is not presently able to construct an automated trading model and have the model trade without human intervention. This severely limits the trader's ability to reap the benefits, such as trading using a pre-tested trading model, that fully electronic trading would provide him.

It would be desirable to provide a customizable spreadsheet application—e.g., Microsoft Excel in which mathematical functions and calculations may be customized or selected by the user—that includes an interface to an ETS, the ETS being used for trading fixed income related instruments, wherein the functionality of the spreadsheet application is accessible to the user as he trades in the ETS.

It would be further desirable to include an application program(ming) interface (hereinafter, "API") within the a customizable spreadsheet application that allows for efficient communication between a spreadsheet application and an ETS.

SUMMARY OF THE INVENTION

Systems and methods relating to an improvement in a customizable spreadsheet application, the improvement for interfacing between the customizable spreadsheet application and an electronic trading system, are provided. The improvement includes an application programming interface that functions in-process with the customizable spreadsheet application to link the spreadsheet application to the electronic trading system.

BRIEF DESCRIPTION OF THE DRAWINGS

Further features of the invention, its nature and various advantages will be more apparent from the following detailed description of the preferred embodiments, taken in conjunction with the accompanying drawings, in which like reference characters refer to like parts throughout, and in which.

DETAILED DESCRIPTION OF THE INVENTION

Figure 1:
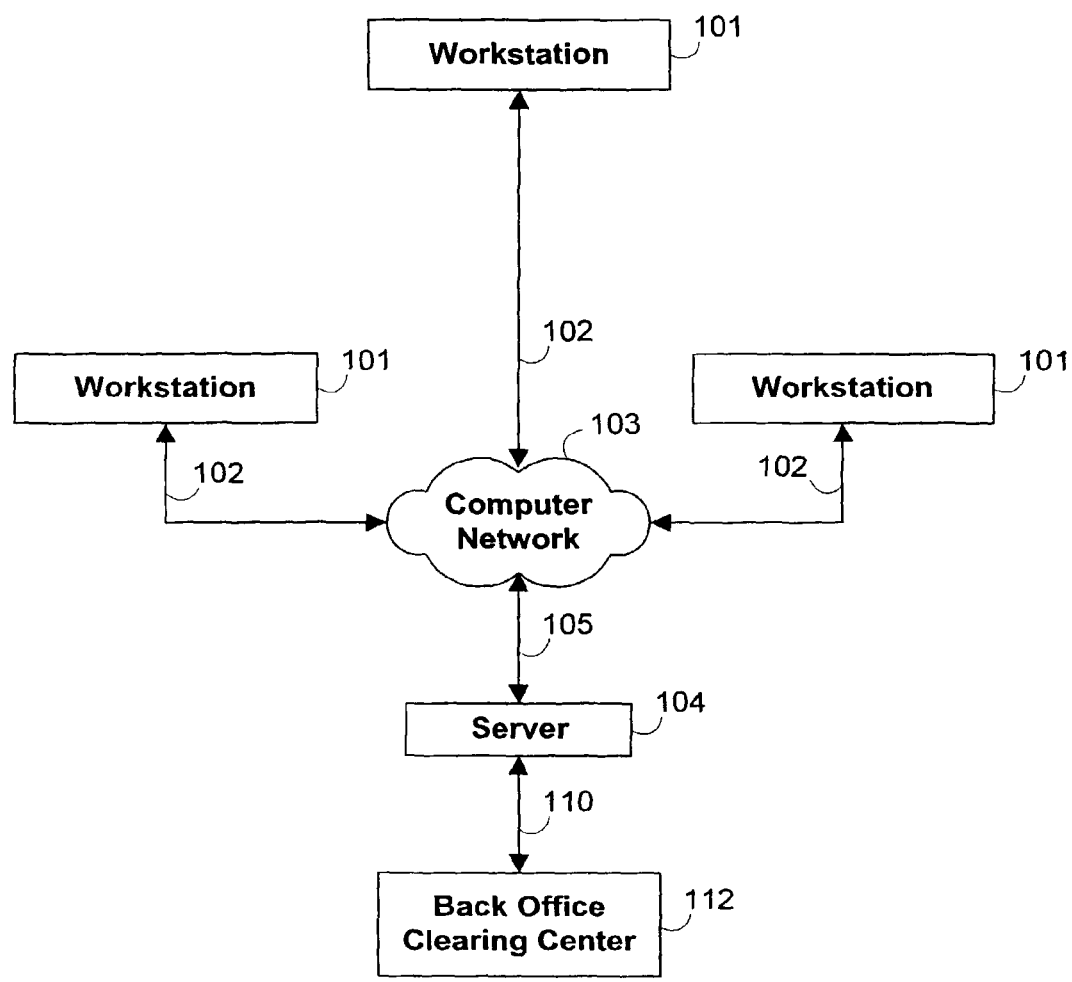
FIG. 1 is an illustration of an electronic implementation of a trading system according to the present invention.

Typically, ETSs for fixed income related instruments are constructed in a client-server system. The client trades the instruments from his remote location by way of the ETS. In legacy ETSs, the client's ability to utilize automation with respect to inputting his commands to the system is restricted to commands such as good-til-canceled (GTC), all-or-none (AON), stop, market-if-touched (MIT) or limit orders.

One drawback of the functionality of legacy systems is as follows. In an exemplary electronic legacy limit order, when the market is trading at 100, a limit order instructs the system to purchase a desired volume of the instrument at 99 or, alternatively, to sell at 101.

However, these legacy limit orders, or similar orders or functions, had no internal adaptive trading model to adapt to changing market conditions—i.e., they were non-dynamic. Thus, if the market price passed through 101 quickly and the limit order was to sell a particular volume at 101 and the volume was not cleared in the time that the market was at 101, the limit order would continue to sell the remainder of the volume at 101, even though the market may have been at 102, 103, or 104 etc—i.e., buyers and sellers were trading at a substantially higher price than the limit order. Thus, legacy electronic trading commands often result in price distortion and/or inaccuracies in trading, each of which may cause a trader to incur substantial losses.

Utilizing the known functionality of a customizable spreadsheet application—e.g., Microsoft Excel—gives the user the ability to create a dynamic trading model that may preferably interact with the market. Thus, as in the previous example, if the user wanted to sell at 101, the user could program into his spreadsheet application to sell (or post an offer for) a pre-determined value with respect to the market. Thus, the user could preset his spreadsheet application to sell at the market price when the market is 101 or greater. In this manner, the spreadsheet application provides a dynamic interface for the ETS—i.e., an interface that includes the capability to adapt to changing market conditions without being tied to a particular set of conditions as in the legacy limit order described above. In this way limitations of the legacy ETSs are overcome by using the functionality of an already existing software application—e.g., Microsoft Excel.

Exemplary additional functions of the spreadsheet application are found in "MBA's Guide to Microsoft Excel 2000: The Essential Excel Reference for Business Professionals (with Cdrom)," by Stephen L. Nelson, which is incorporated by reference herein in its entirety. Such functions may relate to and include, calculating yield of a bond based on the price of the bond, price based on yield, calculating the next coupon on a bond, the previous coupon on the bond, or interpolating—i.e., deriving a fair market value for a particular investment (such as a fixed 3-year investment) based on known price points for other investments (such as 2-year and 5-year United States Treasury Bonds). Other, more particular functions may include 1) calculating the price for a security having a pre-determined face value when the first coupon period is odd—shorter or longer than a typical coupon period—, 2) calculating the yield of a security having a pre-determined face value when the first coupon period is odd—shorter or longer than a typical coupon period—, 3) calculating the price of a security having a pre-determined face value when the last coupon period is odd—shorter or longer than a typical coupon period—, 4) calculating the yield of a security for a pre-determined face value of a security when the last coupon period is odd—shorter or longer than a typical coupon period—, 5) calculating the price for a security having a pre-determined face value given the settlement date, maturity date, coupon rate, yield, redemption price, coupon frequency, and basis, 6) calculating the price of a discounted security for a pre-determined face value, calculating the yield of a security given the settlement date, maturity date, coupon rate, price redemption price, coupon frequency, and basis.

One substantial impediment to a system utilizing the functionality of a customizable spreadsheet application as a user interface (also known as a "front end") of an ETS is the difficulty in maintaining accurate, high-speed, communication between the spreadsheet application and the ETS. Because trading in fixed income markets involves relatively large amounts of money, any inaccuracy or other miscommunication in the trading could incur large losses.

Legacy systems have attempted to place an independent application using a "common denominator" language as an add-in or interface between the spreadsheet application and the ETS. This additional layer of software has been implemented using languages and methods such as VBA (Visual Basic for Applications), DDE (Dynamic Data Exchange) OLE (Object Linking and Embedding), and/or COM (Component Object Model) to create the communication. However, these systems, in which an application—e.g., a spreadsheet application—may be required to yield execution to the communications module which, in turn, contacts the ETS, have not been operable to the extent required by the ETS of a relatively fast-moving financial market.

Systems and methods according to the invention, on the other hand, preferably use a different approach to solving the communications problem presented by using a spreadsheet application as a user interface to an ETS. In systems and methods according to the invention, the software that is used to provide commands to and receive commands from the ETS—such as an eSpeed™ proprietary software-based trading system—is built into the spreadsheet application itself.

To understand the advantage of this approach, the following more detailed explanation of the operation of systems according to the invention may be helpful. In technical terms, using systems and methods according to the invention, the spreadsheet application itself may be running numerous processes, including communication to and from the ETS and/or other market data sources as well as calculation, substantially simultaneously. The add-in is implemented preferably within the spreadsheet application as a multi-threaded add-in to the spreadsheet application program and not as an independent, external—i.e, out-of-process—module or application. One preferable way to implement the add-in within the spreadsheet is to build the add-in using the Software Development Kit of the spreadsheet application program—e.g., the Software Development Kit of Microsoft Excel. A Software Development Kit is a programming package that enables a programmer to develop applications (in this case, the multi-threaded add-in) for a specific platform (in this case Microsoft Excel.)

A multi-threaded add-in to a spreadsheet application may work in the following way: First, the spreadsheet application receives the most recent value or values from the ETS or other market data sources. The spreadsheet application may then perform calculations based on the formulas and functions as entered by the designer or user of the spreadsheet. These calculations derive a result which then may be in the form of a trading command or value of some suitable sort. Then, the spreadsheet application may send the electronic trading commands or values to a queue (this step will be discussed in more detail later). Preferably at pre-determined intervals, any values and/or commands in the queue may released to the ETS. Each of these separate steps may be a thread in the multi-threaded add-in. The multi-threaded nature of the add-in allows each of these threads to occur without interrupting the operation of any of the other threads, or of any threads operating in the spreadsheet application.

Because the add-in (alternatively referred to as an application programming interface) operates as an intrinsic part of the spreadsheet application, the functions of the add-in (such as receiving data from the ETS or other market data source, sending data to the ETS, or queuing the data) may be invoked directly through the spreadsheet application's user interface. In other words, the spreadsheet application user interface invokes a spreadsheet function which is provided by the multi-threaded add-in. Thus, the communication between the spreadsheet application and the add-in is substantially error-free. This reduces preferably by at least half, the complexity of a system and methods according to the invention relative to the system and methods that attempt to use a generic program to communicate between the spreadsheet application and the ETS. This reduction in complexity is because systems and methods according to the invention do not require out-of-process, translated, communication between the spreadsheet application and the add-in. Moreover, the approach followed by the invention to solving the problem removes an entire layer of software from the system.

A further impediment to a system utilizing a customizable spreadsheet application is that the spreadsheet application may preferably calculate and produce trading values and/or commands to be sent to the ETS at a rate that is faster than the ETS can process or that can be acted upon by market participants. In previous attempts to interface a spreadsheet application with an ETS, the values and/or commands were calculated by the spreadsheet application, communicated to the ETS, and then queued in a buffer located at the ETS until the values and/or commands could be acted upon by the ETS. This approach, however, was problematic because the values were often queued and not acted upon until a substantial time delay passed. By the time the orders were finally acted upon, they were not synchronized with the present state of the market. This caused dislocation and inaccuracies between the trader's order entry and the posting, or filling of the order. Therefore, there exists a need to control the speed of the interaction such that the values and/or commands that are generated by the spreadsheet application are communicated in a timely and accurate fashion to the ETS.

Systems and methods according to the invention preferably address this problem of providing accurate trading commands from the spreadsheet application to the ETS as follows. For example, the spreadsheet application may be in substantially constant communication with the ETS with respect to a particular fixed income related instrument, commonly referred to as an issue. Once the trader has entered a trading model into the spreadsheet application, the spreadsheet application may use the model to send trading values and/or commands to the ETS via the add-in based on incoming market communications. As described above, the speed of the spreadsheet application may allow the spreadsheet application to provide values and/or commands to the ETS faster than the ETS can process the values and/or commands. In a system according to the invention, the add-in preferably maintains its own internal queue of values and/or commands to be distributed to the ETS at pre-determined intervals in order to regulate the rate of output of the values and/or commands to the ETS.

The following three steps may be used to distribute the commands or values from the spreadsheet application to the ETS. First, the most recent trading command is entered as the command to be executed for the issue. Second, before the pre-determined interval of distribution to the ETS occurs, a second, more recent, command may be substituted for the first command as the next to be executed. Third, the second command is distributed to the ETS for execution.

In the above-described system and method, the only commands or values that are communicated to the ETS are those that are available at the pre-determined time set for communication between the spreadsheet application and the ETS. The queue had, therefore, been established within, and regulated by, the spreadsheet application, preferably located at the trader's desk, as opposed to at the ETS. Thus, every time a new command is generated with respect to a particular issue, it preferably immediately replaces any previous command in the queue position that stores the data. This queue position may be considered a "ready-to-communicate" position for preparing the data for export to the ETS.

The commands may be communicated to the ETS only at specific, pre-determined, times. Therefore, the most recent (and market reflective) commands are communicated to the ETS and "stale" commands are not communicated. Furthermore, the ETS is insulated from an overflow of trading commands because the trading commands may be communicated at a predetermined rate without substantially affecting the accuracy or timeliness of the trading commands.

In an alternative embodiment, systems and methods according to the invention may be used to implement the spreadsheet application to post or trade multiple instruments, or to post in multiple markets, substantially simultaneously. This capability geometrically increases the ability of a user to trade. Whereas in the past, a user could only trade a limited number of instruments—e.g., five—because the user was limited by the requirement to maintain his positions manually, with methods and systems according to the application, a user may trade in literally hundreds of different instruments.

It should be noted that with respect to the alternative embodiment involving multiple instruments, the queuing mechanism may involve a more complex strategy or design. For example, if the ETS could only handle a portion of the multiple items in the queue, then the queue may be prioritized to process a first portion of items at a first time and then to process a second portion of items at second time. The times may be arranged at pre-determined interval. The prioritization of items in the queue may preferably occur on a first-in, first-out basis. Taking the above example one step further, the values of the second portion of items in the queue may be updated while during the interval between the first time and the second time.

Referring to FIG. 1, exemplary system 100 for implementing the present invention is shown. As illustrated, system 100 may include one or more workstations 101. Workstations 101 may be local or remote, and are connected by one or more communications links 102 to computer network 103 that is linked via communications links 105 to server 104. Server 104 is linked via communications link 110 to back office clearing center 112.

In system 100, server 104 may be any suitable server, processor, computer, or data processing device, or combination of the same. Server 104 and back office clearing center 112 may form part of the ETS. Furthermore, server 104 may also contain the customizable spreadsheet application program and merely transmit a Graphical User Interface or other display screens to the user at the user workstation.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard-wired links, etc.

Workstations 101 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 102 may be used to implement the customizable spreadsheet application interface application according to the invention.

Back office clearing center 112 may be any suitable equipment, such as a computer, a laptop computer, a mainframe computer, etc., or any combination of the same, for causing transactions to be cleared and/or verifying that transactions are cleared. Communications link 110 may be any communications links suitable for communicating data between server 104 and back office clearing center 112, such as network links, dial-up links, wireless links, hard-wired links, etc.

Figure 2:
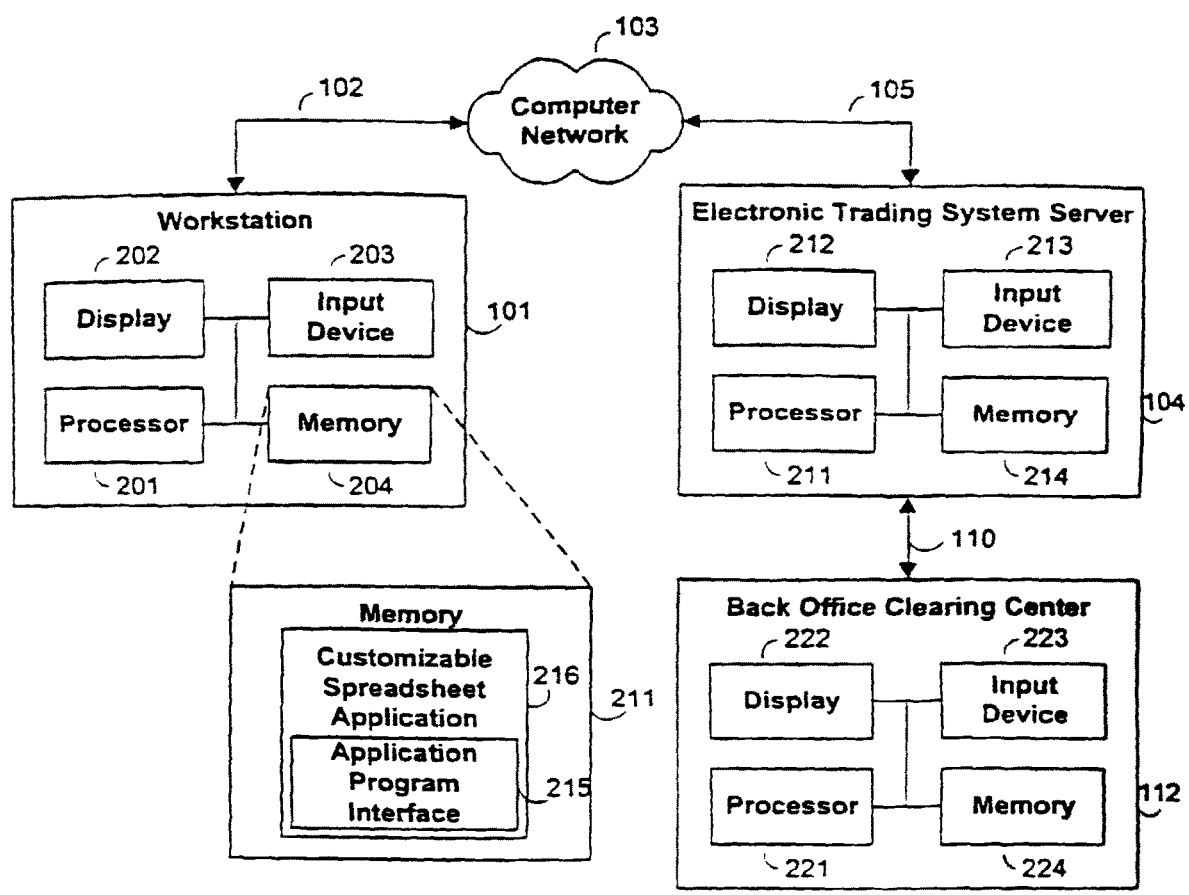
FIG. 2 is a block diagram of a workstation and a server that may be used to implement the processes and functions of certain embodiments of the present invention.

The server, the back office clearing center, and one of the workstations, which are depicted in FIG. 1, are illustrated in more detail in FIG. 2. Referring to FIG. 2, workstation 101 may include processor 201, display 202, input device 203, and memory 204, which may be interconnected. In a preferred embodiment, memory 204 contains a storage device for storing a workstation program for controlling processor

201. Memory 204 also preferably contains a customizable spreadsheet application 216 according to the invention.

Customizable spreadsheet application 216 may preferably include application program interface 215, or alternatively, as described above, customizable spreadsheet application 216 may be resident in the memory of server 104. In this embodiment, the ETS may contain customizable spreadsheet application 216 and application program interface 215 as a discrete application from the ETS application which also may be included therein. The only distribution to the user may then be a Graphical User Interface which allows the user to interact with customizable spreadsheet application 216 resident at server 104.

Processor 201 uses the workstation program to present on display 202 spreadsheet application information relating to market conditions received through communication link 102 and trading commands and values transmitted by a user of workstation 101. Furthermore, input device 203 may be used to manually enter commands and values in order for these commands and values to be communicated to the ETS. Alternatively, input device 203 may be used to configure the spreadsheet application according to a trading model.

An example of such a trading model is as follows. The cash price for a commodity and the futures price for the commodity should be substantially the same, taking into account the present value determination of the futures price and other non-essential factors. If a divergence occurs between the cash price and the futures price one may either buy or sell either the cash price of the commodity or the futures price of the commodity based on the assumption that the divergence will eventually resolve itself—i.e., the cash price and the futures price for the commodity will again be the same. When the divergence is resolved, the position may be closed and the gain may be obtained.

Server 104 may include processor 211, display 212, input device 213, and memory 214, which may be interconnected. In a preferred embodiment, memory 214 contains a storage device for storing information relating to market conditions received through communication link 102 or through other links, and also receives trading commands and values transmitted by one or more users. The storage device further contains a server program for controlling processor 211. Processor 211 uses the server program to transact the purchase and sale of the fixed income related instruments.

Back office clearing center 112 may include processor 221, display 222, input device 223, and memory 224, which may be interconnected. In a preferred embodiment, memory 224 contains a storage device for storing a clearing program for controlling processor 221. Processor 221 may use the clearing program to complete the transactions that are entered into by the users. Processor 221 uses the clearing program to further verify that the transactions are completed and cleared.

Figure 3:
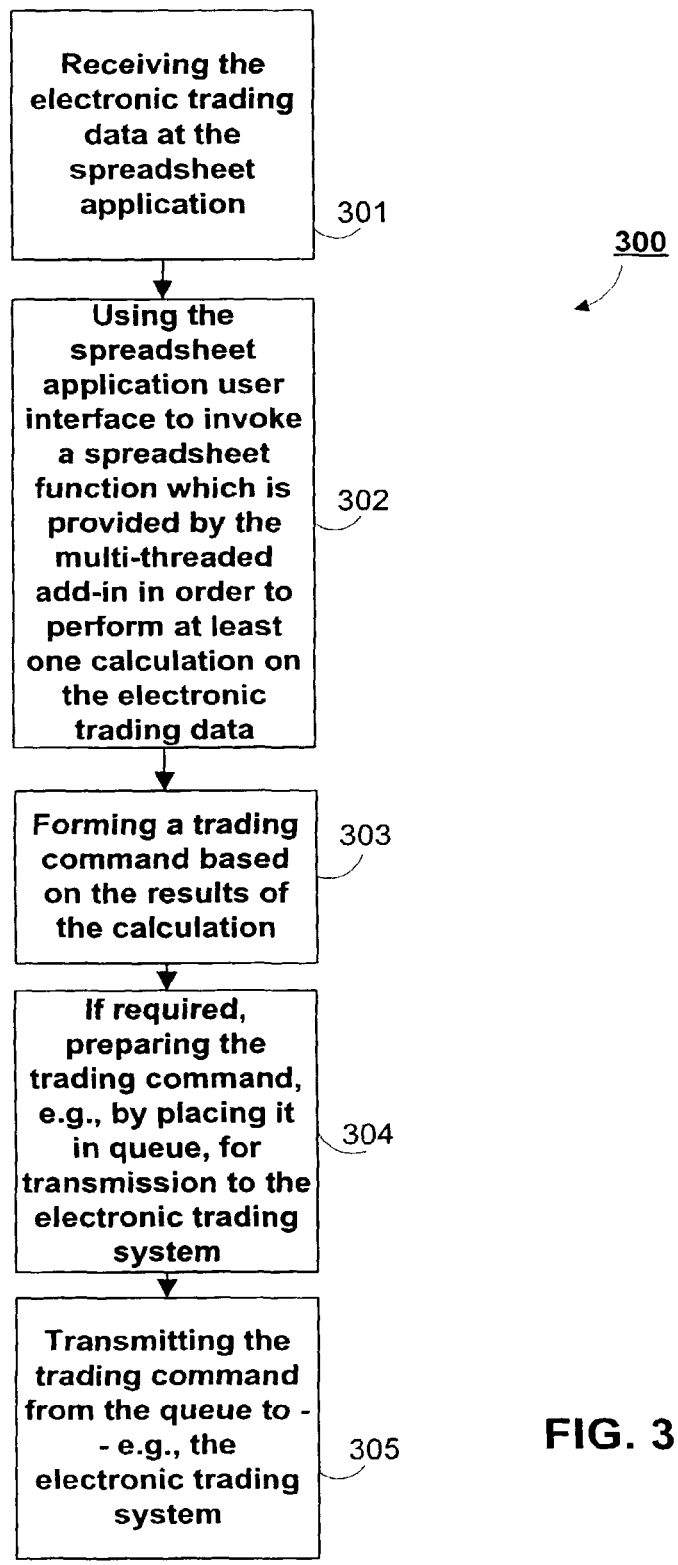
FIG. 3 is a flow chart of a method according to the invention.

FIG. 3 shows a flow chart 300 of a method according to the invention. Step 301 shows receiving the electronic trading data at the workstation (or other suitable device). The workstation may contain the spreadsheet application. The data may be received from an ETS or any other suitable data provider. Step 302 shows using the spreadsheet application user interface to invoke a spreadsheet function which is provided by the multi-threaded add-in in order to perform at least one calculation on the electronic trading data.

Step 303 shows forming a trading command (the trading command may be, for example, a bid or offer having a particular price and size or the trading command may be any other suitable value or values) based on the results of the calculation in step 302. In a more broad sense, step 303 may be understood to mean generating a trading command based on a change, or changes to market conditions. This generating may include performing a logic function on the ETS data or other suitable data, formatting the ETS data in a format that is acceptable by the spreadsheet application, or formatting the spreadsheet application data in a format that is acceptable by the ETS. Thus, the calculating of step 303 may not be necessary because the only action that may be required by the spreadsheet application may be that the add-in transmits commands or values to the ETS based on the received information from the ETS or other market data sources. Step 304 shows, if required, preparing the trading command—e.g., by placing it in queue—for transmission to the electronic trading system. Step 305 shows transmitting the trading command from the queue to—e.g., the electronic trading system. The calculated electronic trading data may be transmitted to the electronic trading system or to any other suitable recipient.

Thus, FIG. 3 shows a flow chart of the typical operation of one embodiment of a customizable spreadsheet application interface for an ETS according to the invention. It should be noted that, in alternate embodiments of the invention, the order of all the steps may or may not be restricted to the order shown in the exemplary flow chart or portions of the exemplary flow chart. It should be further noted that each of the steps shown in the flow chart may be performed in or by a spreadsheet application located either at a workstation or at a server.

In an alternative embodiment, the system according to the invention may be used without receiving data from a data provider. For example, the system may implement spreadsheet functionality to verify data input by a user. This verification, which may involve rejecting a user input price that varies at more than a pre-determined value or percentage from the market price, may be user-configurable. Thus, the system enables the user to set the parameters of the controls on his trading activities. In yet another embodiment, the system may be used by a network administrator to limit the positions taken by an individual user to a percentage of assets, a pre-determined value or amount, or in any other suitable fashion.

Figure 4:
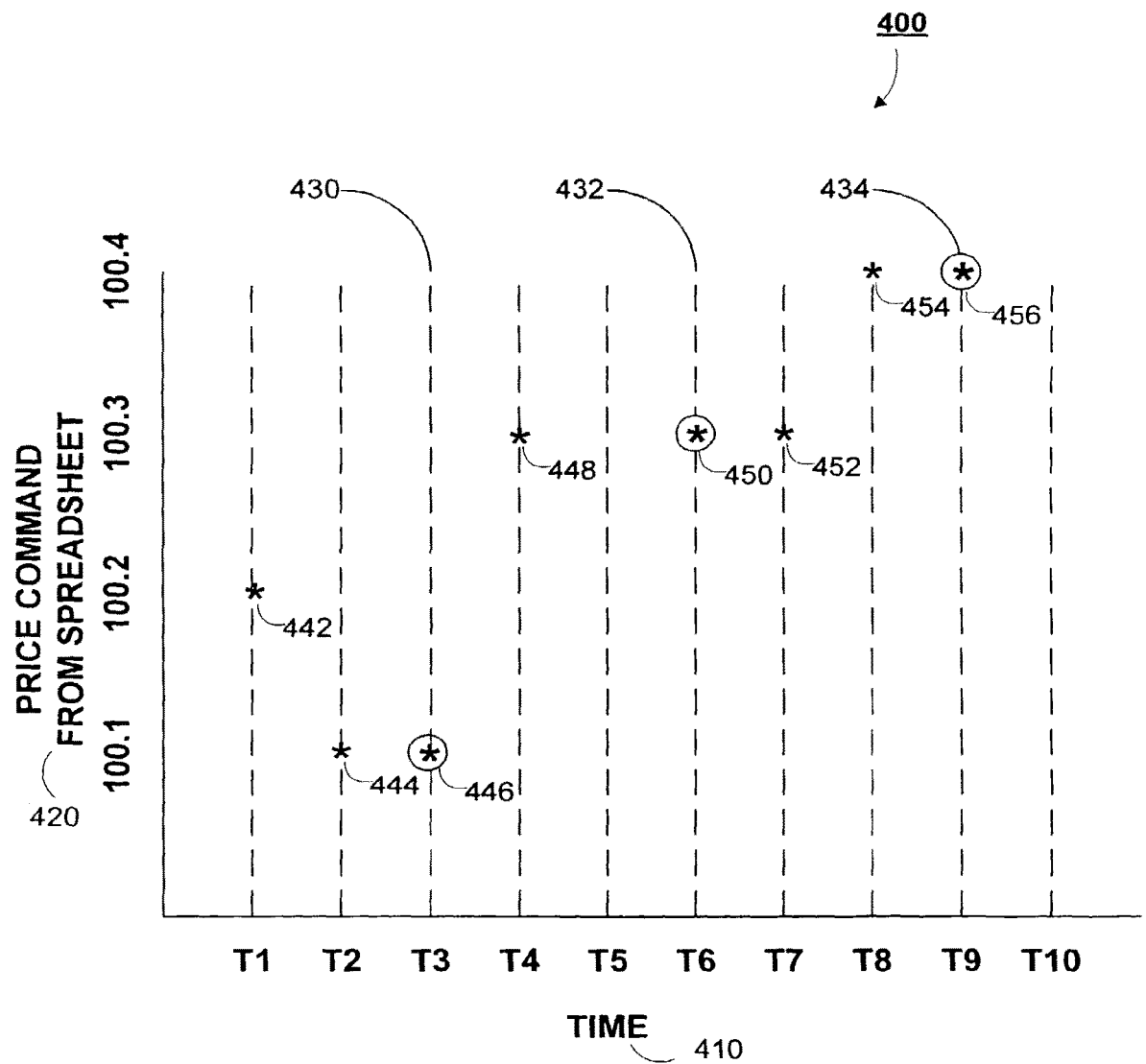
FIG. 4 shows an illustration relating to the timing of execution of orders in a system according to the invention.

FIG. 4 shows an illustration 400 relating to the timing of execution of orders in a system according to the invention. X-axis 410 shows times as they occur in pre-determined intervals from time T1 to time T10. Y-axis 420 shows a scale of price levels of the command that is in the queue to be communicated or exported from the spreadsheet application to the ETS.

Though FIG. 4 shows the timing of execution of orders of a single instrument, it is understood that the scope of the invention includes execution of orders relating to multiple instruments (and the implementation of a single queue having multiple instruments or, alternatively, multiple queues.) The distribution of each of the commands and/or values relating to multiple instruments may occur at one or more different times or intervals.

Times T3, T6 and T9 are indicated by numerals 430, 432, and 434. These times are the pre-determined times when the command in the queue of the spreadsheet application is communicated to the ETS. Unlike a new command or value, which may be generated at substantially any time (as indicated by the fact they are shown at irregular times T1, T2, T4, T7 and T8) as a result of changes to market conditions, the communication times may be implemented at any suitable pre-determined interval—e.g., every 0.1, 0.2 seconds, every 0.5 seconds. One major factor in determining the timing of the communication may be the ability of the ETS to process the incoming commands from the workstation or from numerous workstations.

In one preferred embodiment, the minimum interval between the communications to the ETS may be set at a value that represents the maximum ability of the ETS to receive trading commands. In this embodiment, the timeliness of the commands is maximized.

Command points 442, 444, 448, 452, and 454 each indicate commands originating from the spreadsheet application for communicating to the ETS. Communication points 446, 450 and 456 indicate the respective values, 100.1, 100.3 and 100.4 which may be communicated to the ETS at times 430, 432 and 434. These values may indicate bids, offers, midpoints of a bid/offer spread or any other suitable metric or value for communicating to the ETS. The values are exemplary, and are not intended to limit the invention to a particular configuration or set of values, but only indicate one possible set of values that may be communicated.

It should be noted that no new values are generated by the spreadsheet application at times 430, 432, and 434. In this particular embodiment, the queue includes only those values generated, or held over, from the previous time. Nevertheless, in an alternative embodiment (not shown), the communication can occur between times such that the time immediately preceding communication (by less than a full interval) may also be used to update the value in the queue. In any case, the communication should preferably occur with the most recent command or value that had been previously stored in the queue, and not one that may be determined at the same time as the value is being communicated to the ETS. Nevertheless, such an embodiment where the generating and/or storing of a new command in the queue occurs substantially simultaneously with the communication interval is also within the scope of the invention.

Figure 5:
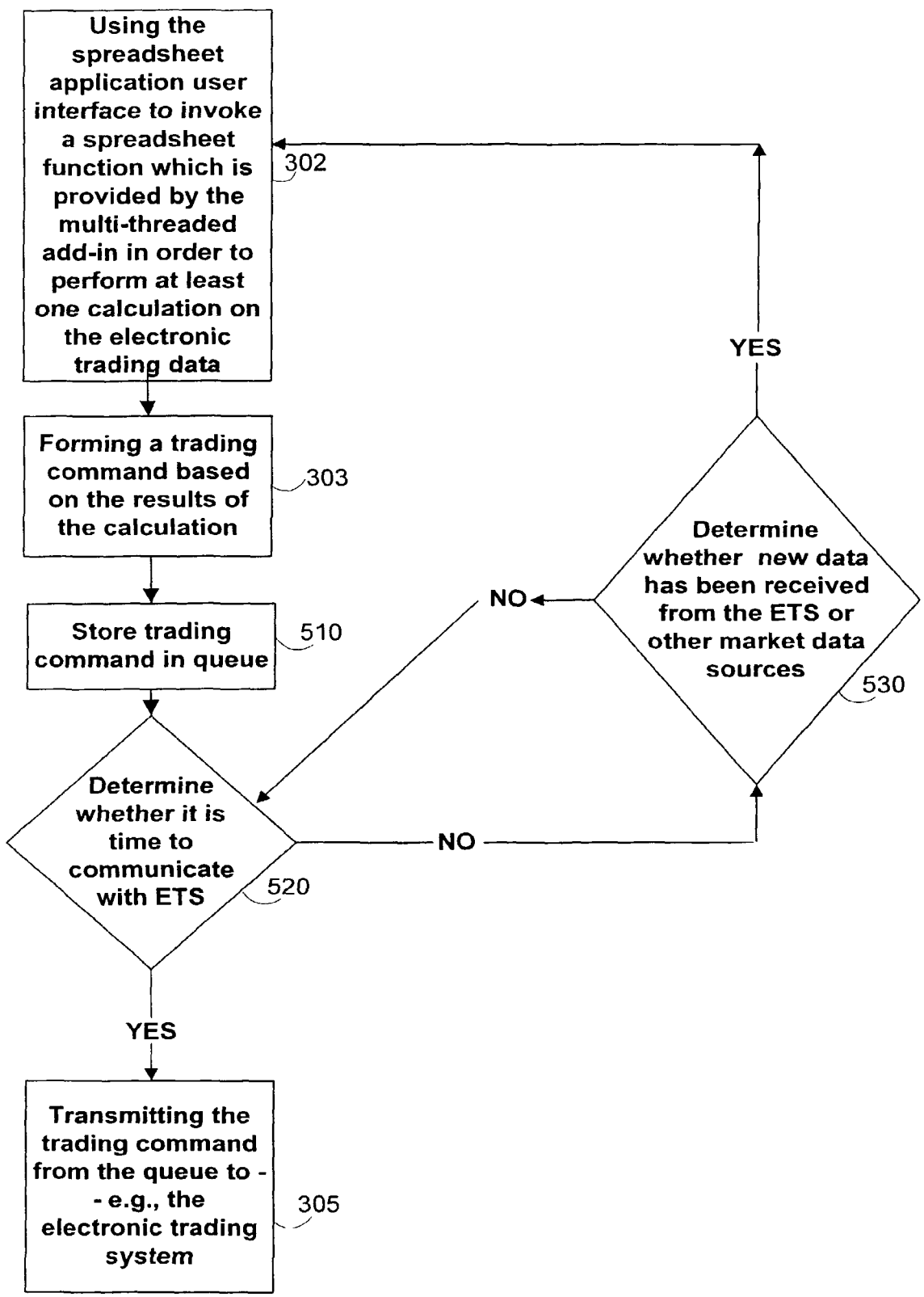
FIG. 5 is a flow chart of a method according to the invention including reference to time of order execution.

FIG. 5 shows an expanded, and more detailed, portion of the flow chart shown in FIG. 3. Step 510 shows storing the trading command in the data field identified above as the queue. At this point the trading command is ready for export to the ETS. Step 520 determines whether it is time to communicate with ETS. If the time has occurred, then the flow chart shows step 305, as in FIG. 3, where the spreadsheet application transmits the calculated electronic trading data from the queue to the electronic trading system. If step 520 determines that the time to communicate with the ETS has not occurred, then the flow chart continues to step 530.

Step 530 then determines whether market data or other data that affects the status of the command or values in the queue has been received. If new data has been received, then the flow chart returns to step 302 to update the queue with a new command or value, based on the new data, and to place the new command or value in the queue. If no new data has been received, then the flow chart returns to step 510 to determine whether it is time to communicate with ETS. Thus, FIG. 5 shows a method according to the invention that preferably may be used to provide a customizable spreadsheet application as the user interface for an ETS.

Thus, it is seen that systems and methods for providing a customizable spreadsheet application interface for an electronic trading system have been provided. One skilled in the art will appreciate that the present invention can be practiced by other than the described embodiments, which are presented for purposes of illustration rather than of limitation, and the present invention is limited only by the claims which follow.

What is claimed is:

1. A method comprising:
controlling, by at least one processor:
receiving, at an interface of an electronic spreadsheet application, market data in real-time from at least one market data source;
dynamically and simultaneously adjusting a plurality of trading models in accordance to the market data, in which each trading model comprises at least one triggering event that is determined in advance of receiving any market data;
transmitting, over a communication network, the plurality of trading models to be displayed through a first interface of the electronic spreadsheet application on a respective plurality of remote devices;
computing a result for each trading model that is based on the market data;
in response to receiving an indication that at least one triggering event has occurred, generating a plurality of trading commands and queuing the plurality of trading commands in accordance with a prioritization process to avoid network overload; and
transmitting, over the communication network, each trading command in accordance with the prioritization process.

2. The method of claim 1, in which at least one of the trading models is defined by at least one of a formula or a function.

3. The method of claim 1,
in which the plurality of trading commands includes a first trading command, and
further comprising controlling, by the at least one processor, queuing at least a portion of the plurality of trading commands for transmission of at least one of the plurality of trading commands to an electronic trading system at predetermined time intervals.

4. The method of claim 3, in which the at least one of the plurality of trading commands comprises a second trading command and the at least one of the plurality of trading commands does not comprise the first trading command, and
further comprising controlling, by the at least one processor, replacing the first trading command with the second trading command received prior to an occurrence of a predetermined time.

5. The method of claim 3, in which the at least one of the plurality of trading commands comprises a second trading command and the at least one of the plurality of trading commands does not comprise the first trading command, and
further comprising, controlling, by the at least one processor,
receiving updated market data,
computing an updated result based on the updated market data,
generating the second trading command from the updated result, and
replacing the first trading command with the second trading command in a queue of trading commands.

6. The method of claim 1, in which the plurality of trading commands comprises a first trading command, and
further comprising controlling, by the at least one processor, maintaining a queue of trading commands for transmission to an electronic trading system in a prioritized order.

7. The method of claim 6 further comprising:
controlling, by the at least one processor, transmitting a first portion of the plurality of trading commands from the queue to the electronic trading system at a first time and a second portion of the plurality of trading commands from the queue to the electronic trading system at a second time following the first time.

8. The method of claim 7, in which the plurality of trading commands are received in the queue prior to the first time, and
in which one or more trading commands of the first portion of the plurality of trading commands is received in the queue prior to one or more trading commands of the second portion of the plurality of trading commands.

9. The method of claim 1, in which the market data comprises a price for an item and a price for a derivative instrument on the item, and
further comprising controlling, by the at least one processor,
determining an occurrence of a divergence between the price for the item and the price for the derivative instrument on the item, and
in which a first trading command of the trading commands comprises at least one of:
an order to buy the item,
an order to sell the item,
an order to buy the derivative instrument on the item, or
an order to sell the derivative instrument on the item.

10. The method of claim 1, in which the market data pertains to multiple types of instruments in multiple markets and in which each trading model corresponds to a different type of instrument.

11. An apparatus comprising:
a processor configured to control
receiving, at an interface of an electronic spreadsheet application, market data in real-time from a market data source;
generating a trading model that adjusts dynamically to the market data, in which the trading model comprises at least one triggering event that is determined in advance of any market data;
transmitting, over a communication network, the trading model to be displayed on a display through a first interface of the electronic spreadsheet application, in which the trading model that is displayed changes dynamically in real-time;
computing a result based on the market data and the trading model;
in response to receiving an indication that at least one triggering event has occurred, generating a first trading command, in which the first trading command comprises the result that was computed based on the market data and the trading model;
queuing the first trading command in a queue of a plurality of trading commands for transmission to an electronic trading system at a predetermined time; and
transmitting, over the communication network, at least one trading command from the queue, in which the at least one trading command comprises at least one of the first trading command or a second trading command.

12. The apparatus of claim 11, in which the trading model is defined by at least one of a formula or a function.

13. The apparatus of claim 12,
in which the plurality of trading commands comprises the first trading command, and
in which the processor is configured to control queuing at least a portion of the plurality of trading commands for transmission of at least one of the plurality of trading commands to the electronic trading system at predetermined time intervals.

14. The apparatus of claim 13, in which the at least one of the plurality of trading commands comprises the second trading command and the at least one of the plurality of trading commands does not comprise the first trading command, and
in which the processor is configured to control replacing the first trading command with the second trading command received prior to an occurrence of a predetermined time.

15. The apparatus of claim 13, in which the at least one of the plurality of trading commands comprises the second trading command and the at least one of the plurality of trading commands does not comprise the first trading command, and
in which the processor is configured to control:
receiving updated market data,
computing an updated result based on the updated market data,
generating the second trading command from the updated result, and
replacing the first trading command with the second trading command in the queue of trading commands.

16. The apparatus of claim 11, in which the plurality of trading commands comprises the first trading command, and
in which the processor is configured to control maintaining the queue of trading commands for transmission to the electronic trading system in a prioritized order.

17. The apparatus of claim 16,
in which the processor is configured to control transmitting a first portion of the plurality of trading commands from the queue to the electronic trading system at a first time and a second portion of the plurality of trading commands from the queue to the electronic trading system at a second time following the first time.

18. The apparatus of claim 17, in which the plurality of trading commands are received in the queue prior to the first time, and
in which one or more trading commands of the first portion of the plurality of trading commands is received in the queue prior to one or more trading commands of the second portion of the plurality of trading commands.

19. The apparatus of claim 11, in which the market data comprises a price for an item and a price for a derivative instrument on the item, and
in which the processor is configured to control:
determining an occurrence of a divergence between the price for the item and the price for the derivative instrument on the item, and
in which the first trading command comprises at least one of:
an order to buy the item,
an order to sell the item,
an order to buy the derivative instrument on the item, or
an order to sell the derivative instrument on the item.

20. The apparatus of claim 11, in which the market data pertains to multiple types of instruments in multiple markets and in which each trading model corresponds to a different type of instrument.

* * * * *